Sept. 9, 1969   F. W. HARDAWAY   3,466,430
EXTREME PARAMETER SEARCH CONTROL SYSTEM
Filed Jan. 11, 1967   5 Sheets-Sheet 1

INVENTOR.
FRED W. HARDAWAY
BY Moody and Kintzinger
ATTORNEYS

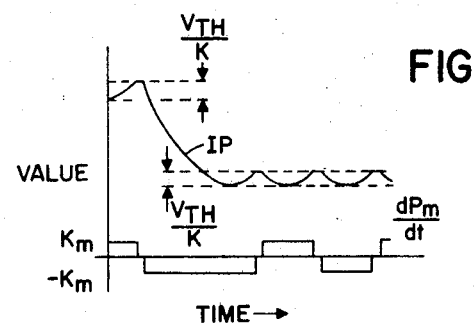
FIG 4
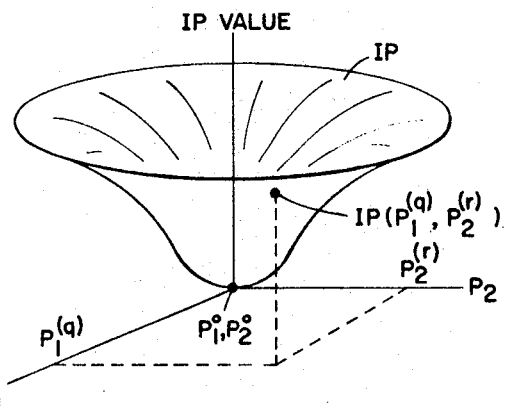
FIG 5
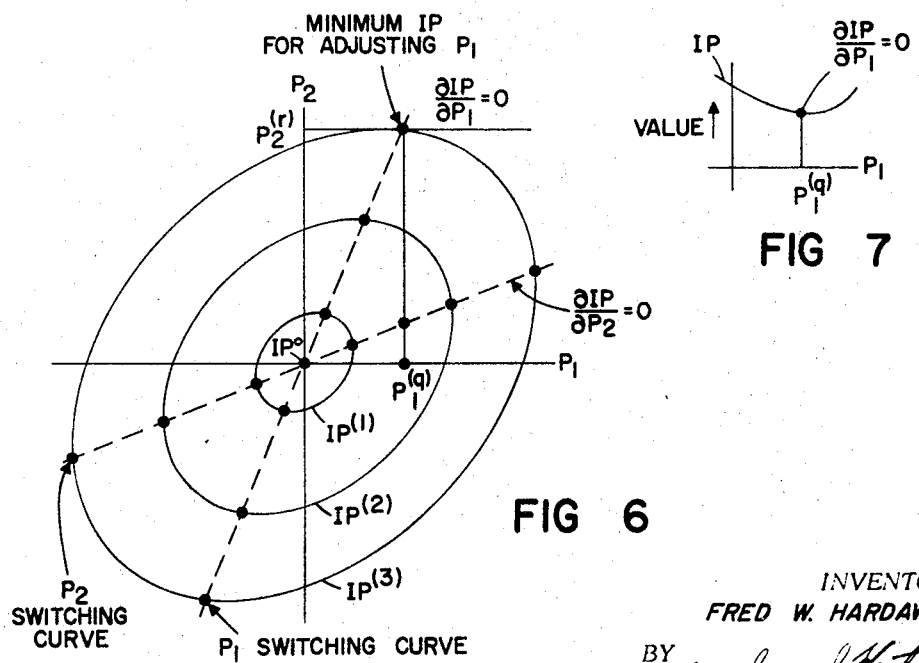
FIG 6
FIG 7
INVENTOR.
FRED W. HARDAWAY

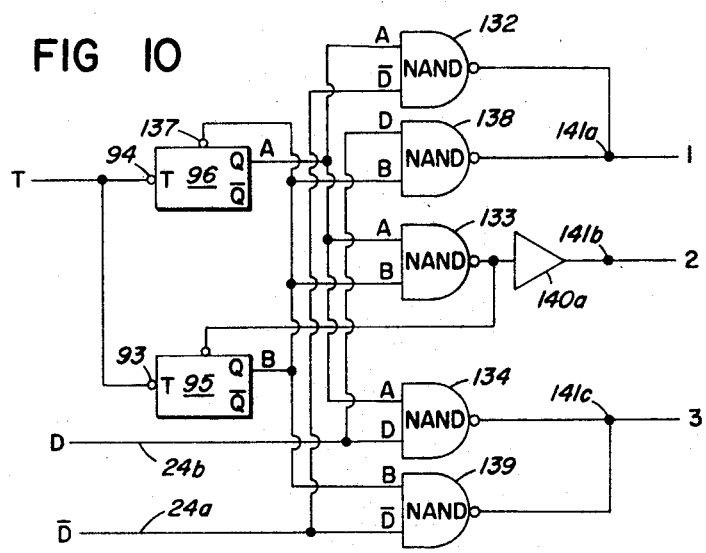
FIG 10
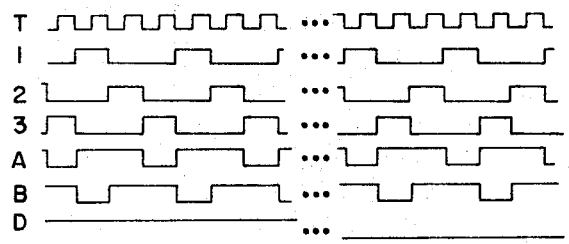
FIG 11a
FIG 11b
H IS HIGH
L IS LOW
X IS IMMATERIAL
| TRUTH TABLE | | | | |
|---|---|---|---|---|
| T | 1 | 2 | 3 | D |
| H | H | L | L | H |
| L | L | H | L | H |
| H | L | H | L | H |
| L | L | L | H | H |
| H | L | L | H | H |
| L | H | L | L | H |
| H | H | L | L | X |
| L | L | L | H | L |
| H | L | L | H | L |
| L | L | H | L | L |
| H | L | H | L | L |
| L | H | L | L | L |
| H | H | L | L | L |
INVENTOR.
FRED W. HARDAWAY
BY
ATTORNEYS

United States Patent Office 3,466,430
Patented Sept. 9, 1969

3,466,430
EXTREME PARAMETER SEARCH CONTROL SYSTEM
Fred W. Hardaway, Arlington, Tex., assignor to Collins Radio Company, Cedar Rapids, Iowa, a corporation of Iowa
Filed Jan. 11, 1967, Ser. No. 608,608
Int. Cl. G06f 15/18
U.S. Cl. 235—150.1                            12 Claims

ABSTRACT OF THE DISCLOSURE

A extreme parameter search control system, for a plant having a plurality of interdependent variable parameters, with a direction computer and controlling circuitry switchable from parameter to parameter for optimizing the control setting of a parameter before subsequent switching to another parameter. It is a system using a DC operational amplifier, in the direction computer, having a feedback circuit with a capacitor and a diode in parallel that is capable of providing a memory function wherein when the diode is forwardly biased it conducts, and then when there is a change in the input to the amplifier, as determined by the IP signal out of the plant being parameter set controlled, such that a reverse bias is developed through the operational amplifier with respect to the diode in the feedback circuit, a charge build up begins on the capacitor in the feedback circuit. This results in an activating voltage build up to a threshold level for threshold controlled circuitry in the direction computer that initiates reversal actuation in the parameter setting drive control of the system. Capacitor discharge switch control circuitry is provided for periodically reset discharging any charge on the feedback capacitor upon each triggered activated control of parameter direction reversal by the direction computer.

---

Figure 1:
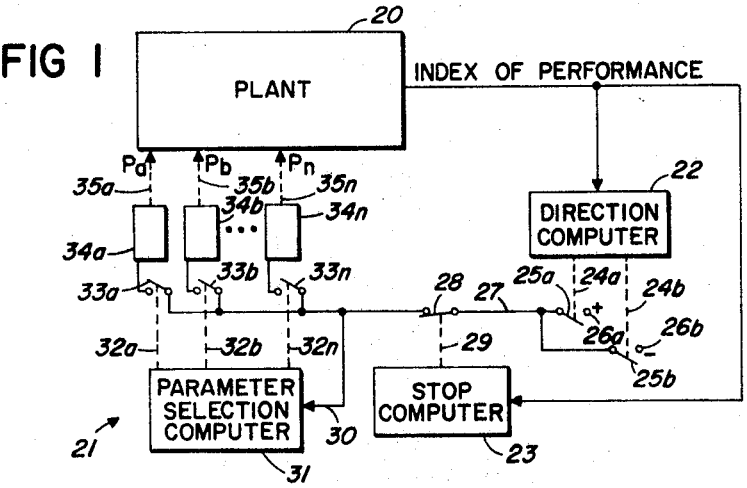

This invention relates in general to control systems for regulating variable parameters, and in particular, to an extreme parameter search control system that operates automatically to maximize system performance by varying parameters to an optimized maxima or minima, as may be the case, respectively.

Using the term "extrema," since the optimization of a parameter may be a maximum or a minimum, an extrema search control system adjusts one or more parameters of a given plant to improve the plant performance. An example of a two parameter control system maximizing the measure of performance of a given plant with respect to the adjustable plant parameters is a human as he nulls an impedance bridge. First, he turns one knob while observing a nulling meter for the minimum, and then he adjustably turns the other knob for the minimum. He continues alternating between the two knobs for controlling the two parameters until an adequate null is reached.

Many systems and schemes have been employed in extrema control systems with some utilizing adjustment of all the interdependent parameters at the same time to approach the extremum in the direction of steepest descent, or, in other words, the direction of fastest approach. Some of the other approaches that have been employed adjust one parameter at a time, and this is the approach made use of and employed in the herein disclosed system.

An operating plant where a need for an extreme parameter search control system exists is with an antenna coupler used to couple two transcievers to the same antenna and to provide isolation between the transcievers, when, for example, one is transmitting and the other is receiving. When one transceiver is transmitting and the other is receiving, the coupler must provide maximum isolation to the transmitted frequency at the input to the transciever acting as a receiver to keep the transmitted signal from reducing the receiver sensitivity by action such as AGC action in the receiver. The function of applicant's extrema control system, as applied to such a plant, is to adjust two of the coupler's parameters to maximize the isolation of the transceiver acting as a receiver at the input to the receiving transceiver with respect to the transmitted frequency. The input to the controlling system is the magnitude of the signal power at the input to the transceiver acting as a receiver and with this signal power level at the input to the transceiver acting as a receiver being called an index of performance (IP) that must be optimally minimized through adjustment of the two parameters. In order that this may be accomplished one parameter at a time, a parameter direction reversing computer must be employed. Then, switching from one parameter to another must be accomplished, after each parameter direction computer adjusting sequence, for a repeated direction computer adjusting sequence with respect to each of the subsequently serially selected parameters, and a controlling adjustment input must be provided to the plant subject to direction and control by the direction computer and the parameter selection computer for providing desired plant adjustments in maximizing the overall system performance.

It is, therefore, a principal object of this invention to provide an extrema control system automatically maximizing system performance through serially and cyclically varying multiple interdependent parameters toward optimizing limits.

A further object is to provide such an extrema control system for attaining maximized isolation between a radio frequency source and a radio frequency receiver through sequential and cyclical maximized variance of two parameters in adjustment of an antenna coupler system for coupling an RF signal source and an RF signal receiver to the same antenna.

Another object is to provide a parameter direction driving and reversing system for maximizing or minimizing the control signal as the case may be. This is useful in an extrema control system to, for example, measure and minimize the transmitted signal power level as measured at the input to the receiver and to so control tune the system as to minimize the effective transmitted signal power level as sensed at the input of the common coupler receiver input terminal.

Another object for such a direction computer in an extrema control system is to determine when a signal level of the receiver stops decreasing during such tuning operation of a parameter and then to give a directional reverse of that parameter and for the directional reverses to occur through a predetermined number of sequences before switching to another parameter.

A further object in such an extrema control system is to provide switching from one parameter to another.

Still another object is to provide continually varied controlling inputs to the plant simultaneous with and consistent with parameter value variation controlled drive.

Features of this invention useful in accomplishing the above objects include, in an extrema control system for a plant having a plurality of interdependent variable parameters, a direction computer and controlling circuit switchable from parameter to parameter for optimizingly controlled setting of a parameter before the subsequent switching to another parameter. A parameter selection computer is also included subject to parameter selection switching after a series of three reversals in direction of the direction computer and providing for switching from a parameter to the next parameter after a predetermined length of time has passed without reversals as determined by an RC time constant circuit action for insuring that switching to another parameter occurs. A three phase stepper pulse signal generator is also provided that receives a desired pulse rate lock input signal from a clock signal source, and direction command signal inputs for developing, as needed and called for, three phase logic signals for step positioning motors at the clock input pulse rate in the command directions called for.

A specific embodiment representing what is regarded as the best mode of carrying out the invention is illustrated in the accompanying drawings.

Figure 2:
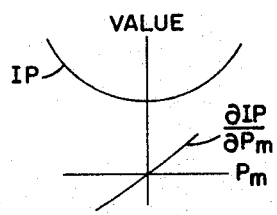

In the drawings:

FIGURE 1 represents a schematic block diagram of a plant having a plurality of interdependent operating parameters and the extreme parameter search control system provided for controlling the parameters of the plant for optimized system performance;

FIGURE 2, a plot of the index of performance (IP) and the $$\frac{\partial IP}{\partial P_m} \text{ vs. } P_m$$

Figure 3:
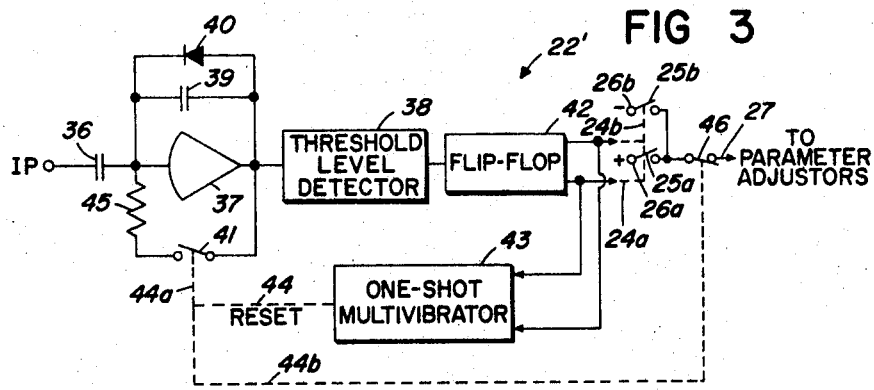

FIGURE 3, a partial schematic block diagram of a parameter minimizing direction computer;

FIGURE 4, a graph plot of both IP and the $$\frac{dP_m}{dt} \text{ vs. time}$$

FIGURE 5, a plot of IP for a particular two-parameter case;

FIGURE 6, a graph plot of $P_1$ vs. $P_2$ for the $$\frac{\partial IP}{\partial P_1}=0$$

and also of the $$\frac{\partial IP}{\partial P_2}=0$$

FIGURE 7, a related graph of IP vs. $P_1$ and showing location of $$\frac{\partial IP}{\partial P_1}=0$$

Figure 8A:
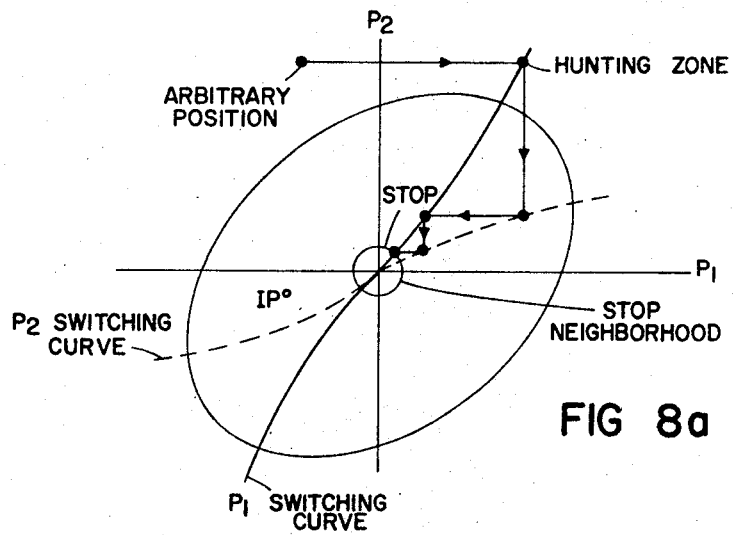
Figure 8B:
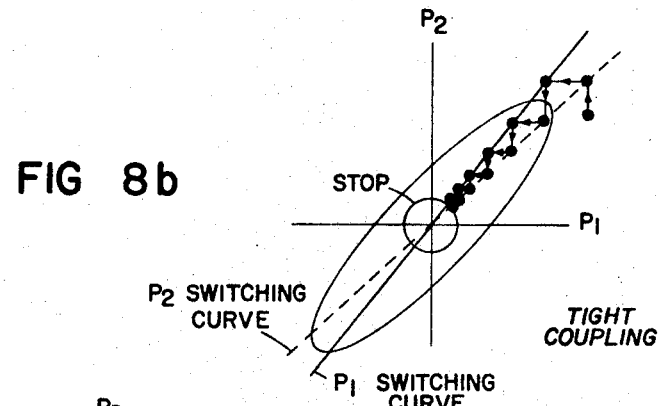
Figure 8C:
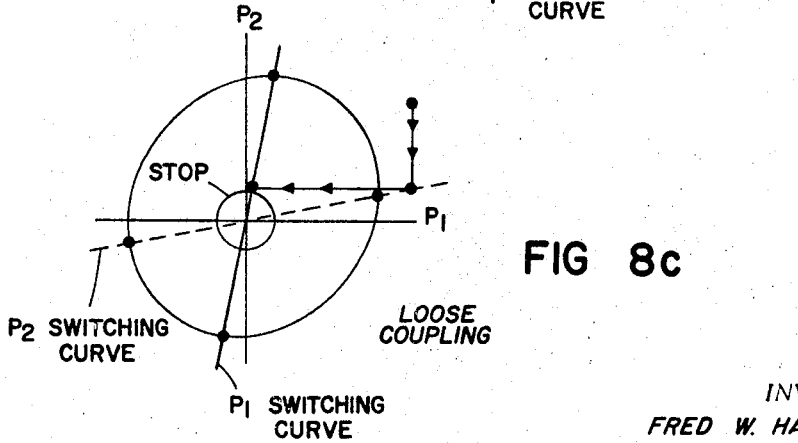
Figure 9:
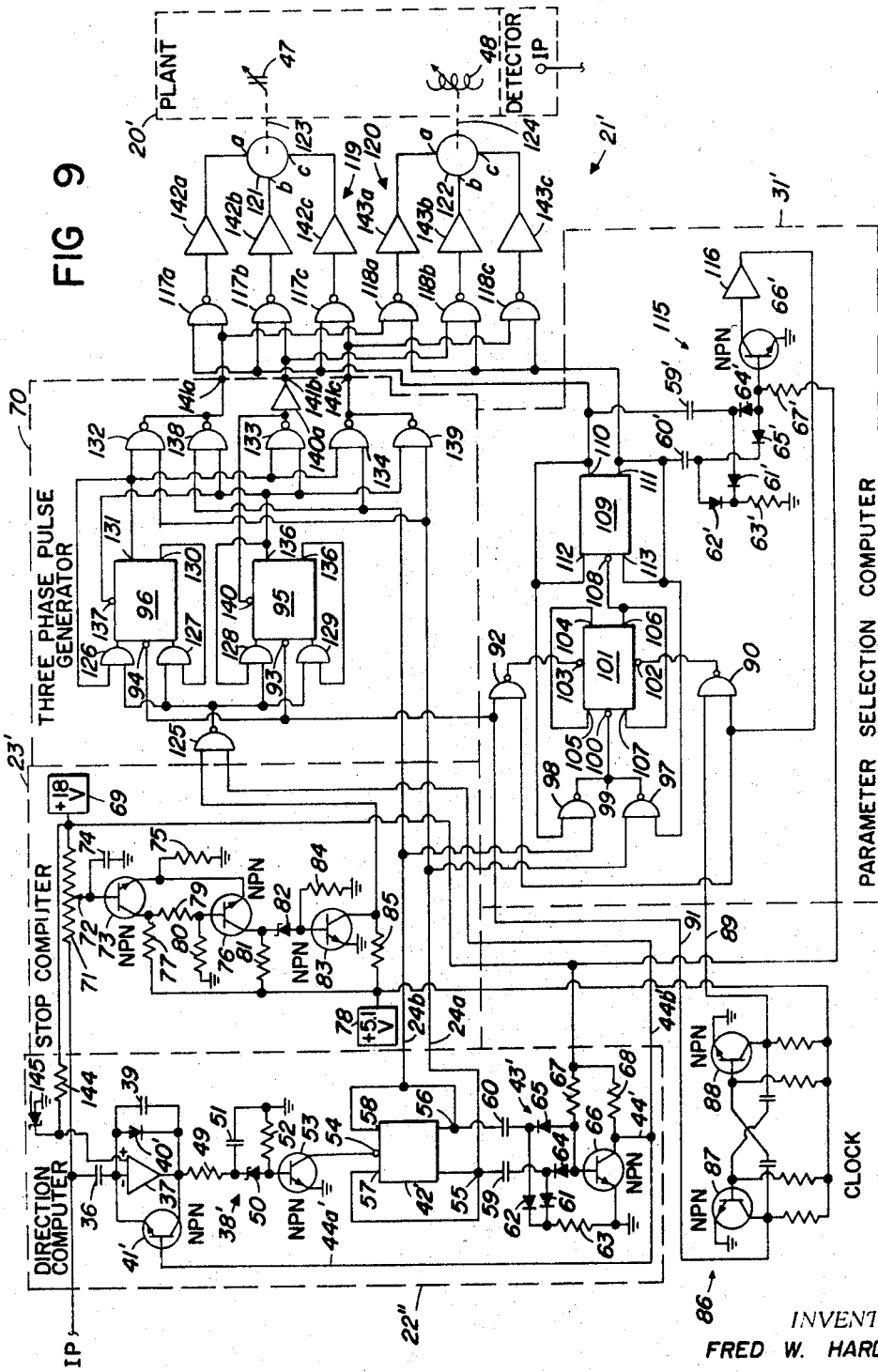

FIGURES 8a, 8b, and 8c plots of the hunting traces relative to parameters $P_1$ and $P_2$ switching curves on a plot of the paramters $P_1$ and $P_2$, with FIGURE 8b being the comparable plot for a system with tight coupling, and that of 8c being the comparable plot for a system with loose coupling, and with each including an indicated stop zone;

FIGURE 9, a schematic and block diagram of a specific practical working example of an extreme parameter search control system incorporating a direction computer such as illustrated in FIGURE 3 and subject to performance characteristics as illustrated in the various graphs;

FIGURE 10 a partial block circuit diagram of a three phase stepper motor drive pulse generator circuit; and FIGURES 11a and 11b are, respectively, a graph of waveforms associated with the three phase clock stepper motor drive circuit of FIGURE 10, and a truth table further illustrating, the relations of the control voltages associated with the 11a waveforms and the three phase stepper motor drive pulse generator circuit.

Referring to the drawings:

An equipment or plant with the requirement that its performance be enhanced with operational requirements subject to change and starting from time to time from unknown parameter value points, with generally two or more interacting parameters, from time to time varied, must have a performance measurement output generally referred to as an index of performance (IP). Any control system for such a plant is required to determine the extrema (minima or maxima) of the IP with respect to each of a plurality of control parameters, as many as there may be, $p_1, p_2, p_3 \ldots p_n$ with a necessary condition for desired extrema setting of the IP being as set forth by the following:

$$\frac{\partial IP}{\partial p_1}+\frac{\partial IP}{\partial p_2}+ \cdots \frac{\partial IP}{\partial p_m}+ \cdots \frac{\partial IP}{\partial p_n}=0 \text{ where } 1\leq m \leq n$$

In the method set forth in this disclosure for moving from an arbitrary position $(p_1, p_2, p_3 \ldots p_n)$ to an extremum optimized position $(p_1^0, p_2^0, p_3^0 \ldots p_n^0)$ when the equation immediately above is valid and true the sequential adjustment of each $p_m$ for the $$\frac{\partial IP}{\partial p_m}=0$$

or substantially so, with $p_m$ representing any one of the parameters as the particular parameter being set. This results, after sequentially adjusting and sufficiently readjusting each and all interdependent parameters, that an extremum state is substantially attained for optimized plant performance. It should be noted that the independent parameters must be restrained to ranges of control adjustment where the IP has no local extrema or false extrema state in order to insure the attainment of the absolute extremum and the utmost in optimization of operational capabilities.

Referring now to FIGURE 1 wherein an equipment or plant 20 having a plurality of controlable mutually interdependent operating parameters is shown to be equipped with an extreme parameter search control system 21. This search control system 21 includes an output index of performance (IP) connection from the plant 20 as a controlling input to a direction computer 22 and also to a stop computer 23. The direction computer is provided with output means 24a and 24b connected to switching devices 25a and 25b which may be controlled for connection to positive voltage terminal 26a or negative voltage terminal 26b. A signal line 27 connected to switches 25a and 25b and extended from the direction computer for the transmisison of direction computer control voltage signals, includes a normally closed switch 28, connected by control means 29 to stop computer 23 for shut-off opening control thereby upon certain predetermined value level inputs to the stop computer 23. The stop computer 23 acts to switch open line 27 if the resulting IP as influenced by parameter inputs being adequately adjusted as reflected by minimized IP change through a predetermined length of time as triggered, for example, by RC time constant circuitry within the stop computer 23. The stop computer 23, when actuated, operates switch 28 to open the line 27. After the switch 28, a branch 30 of the line 27 is provided as an input to the parameter selection computer 31 in order that signals carried by line 27 may be impressed as an input to the parameter selection computer.

The parameter selection computer 31 may be such as to switch to a subsequent parameter for adjustment of the IP whenever the reversals of voltage, as controlled by the direction computer, become of such a short enough interval in reversing polarities as to be in a hunting condition in a bang-bang control system without a dead zone. Conversely, the parameter selection computer 31 could be one employing a divide by three counter and a time dependent reset unit with the inputs to the parameter selection computer being direction commands, i.e., polarity reversals, and the output being parameter selection commands. With such a system when the direction command changes three times the parameter selected is changed to a subsequent parameter for sequentially selected parameter adjustment inputs to the plant. Further, with the inclusion of a time dependent reset unit, if the parameter selected does not result in such change in the IP as to trigger reversals, as detected and controlled by the direction computer 22, after a given length of time, the time dependent reset unit switches the parameter and resets the counter. Such a provision is required with some plants because of the cross coupling present in many plants and with the parameter selected trying to adjust to a false null beyond the limit of adjustment for the parameter. Since such a null cannot be reached, the direction does not reverse three times and therefore the reset unit is needed to select the other parameter, or next if there are more than two parameters. The parameter selection computer 31 is provided with individual outputs 32a, 32b . . . 32n for activating switches 33a, 33b . . . 33n, respectively, which are selectively individualy closed as determined by the parameter selection computer. This provides for application to the selected adjustable parameter of directional controlling voltage input from the line 27 as also determined by the polarity control of voltages imparted to line 27 by the directional computer 22 through the switches 33a, 33b . . . 33n. Thus, respective parameter control is provided with inputs selectively in the form of reversible direction controlling signal voltages applied to the parameter adjustment motors 34a, 34b . . . 34n, respectively. The output drives 35a, 35b . . . 35n, respectively, of motors 34a, 34b . . . 34n are the adjustable controlling inputs to the respective parameters $P_a$, $P_b$ . . . $P_n$, respectively.

With reference to operation, in general, of the extrema control system 21 of FIGURE 1, the direction computer 22 acts to reverse the adjustment direction when the change in IP is away from the extremum. This causes a reversing of the direction of $P_m$ when the $\partial IP / \partial P_m$ changes polarity, with the result that $P_m$ is thereby adjusted to the neighborhood where the $\partial IP / \partial P_m$ is substantially equal to zero. Please note that the position of the particular parameter $P_m$ being adjusted is not necessarily $P_m^0$ unless $P_j$ equals $P_j^0$ where $j$ is equal to 1, 2 . . . $n$. When $P_m$ is adjusted to the neighborhood where the $\partial IP / \partial P_m$ is substantially equal to zero the parameter being adjusted $P_m$ is driven in a hunt state about this neighborhood since it is adjusted, in the embodiment of FIGURE 1, with a bang-bang type control system without a dead zone. As pointed out hereinbefore, the parameter selection computer 31 then switches to the next parameter when this hunting state is encountered with each particular parameter.

With reference to FIGURE 2 at this time and to the plot of IP and the $$\frac{\partial IP}{\partial P_m} \text{ versus } P_m$$

it may be seen that the $\partial IP / \partial P_m$ passes through zero at the extremum of IP.

Referring now to FIG. 3, greater detail is given, in a partial schematic block diagram, of a direction computer 22' that may actually be referred to as a minimizing direction computer. In this minimizing direction computer 22' the IP input is passed through a capacitor 36 as an input to an amplifier circuit 37 having an output connection to the input of threshold level detector circuit 38. The amplifier has a feedback capacitor 39 and diode 40, in parallel, with the cathode of the diode 40 connected to the junction of capacitor 36 and the input of the amplifier 37, and there is also a normally open switch 41 bypassing the amplifier 37 from input to output thereof. The output connection of threshold level detector 38 is an input to flip-flop circuit 42 two outputs of which are converted by conventional means, to mechanical switch moving means for the activation of the switches 25a and 25b, or these may actually be electronically activated and controlled switches rather than a conversion to a mechanical movement for a physical switch such as indicated in the drawings for providing control to opposite polarities or no connection at all for the signal line 27. It should be further noted that the two electrical outputs of the flip-flop 42 are connected as activating inputs to a one-shot trigger circuit 43, the drive train 44 and branch 44a outputs of which are employed for closing the normally open switch 41 to bypass the amplifier 37 and discharge the charge on capacitor 39 and thereby reset the memory function. It should be noted that resistor 45 in series with switch 41 and capacitor 39 prevents surge current overloads when switch 41 is closed by one-shot trigger circuit 43 through drive train 44 and branch 44a. Simultaneously with the closing of switch 41 branch 44b of drive train 44 opens a normally closed switch 46 included in signal line 27. Both switches 41 and 46 remain in this state for a short interval of time as determined as by RC time constant circuitry, of a conventional nature, within the one-shot trigger circuit 43 and then are permitted to return to their normally open and closed states, respectively. Please note that switch 46 is not shown in FIGURE 1 and that it is possible to employ an alternate control system within direction computer 22 that would provide such additional control (or over control) to the outputs 24a and 24b of the computer 22 as to accomplish substantially the same operational results as with the switch 46 provided in line 27 and the control therefor as shown in FIGURE 3.

By way of reiteration, at least to some extent, the direction computer 22' stores or continually adjusts to the value of IP in a memory unit, that is, by conduction through diode 40 with forwardly biasing voltages and charging of the capacitor 39 with reverse bias, and with during periods of forward bias of the diode 40 the selected parameter being caused to change at a constant rate. While the change of IP, the index of performance, is approaching the extrema, the IP imposed bias on diode 40 substantially continuously biases the diode to conduction. When the change in IP is away from the extrema, and such as to reverse the bias on diode 40 the memory unit remembers the last best value of IP, i.e., the point of bias reversal with charging of the capacitor 39 beginning from there. The threshold circuit senses charging of capacitor 39 as a measure of the difference between IP and the extrema value of IP and then when this charge value reaches a threshold level, the changing parameter is stopped and the memory unit is reset for a reset interval time as determined by RC time constant circuitry within the one-shot trigger circuit 43. Then with the switches having been reversed from one polarity contact to the other polarity contact as controlled by outputs of the flip-flop 42, the parameter is adjusted in the opposite direction. It should be noted in the embodiment of minimizing direction computer 22' shown in FIGURE 3 that with the orientation of diode 40, parameter correction is caused to move towards a minimum IP and that an ascending voltage in the positive direction of the IP input signal results in flip-flop actuation of the circuit.

The output of the operational amplifier 37 in the minimizing direction computer of FIGURE 3 may be expressed mathematically by the equation:

$$V_o(t) = -K[IP(t) - IP(0)]$$

for $V_o < 0$ and $$\frac{dIP}{dt} > 0$$

and ultimately with $V_o(t) = 0$ for $V_o(0) = 0$ and $$\frac{dIP}{dt} \leq 0$$

If IP is increasing $$\left(\frac{dIP}{dt} > 0\right)$$

then $P_m$ is adjusting in the wrong direction and $V_o$ is decreased at a rate $K(dIP/dt)$ until $V_o$ reaches the threshold ($V_{TH}$) level. When this condition is attained, the flip-flop circuit 42 toggles, $V_o$ is set substantially to 0, and $P_m$ is adjusted in the opposite direction until the difference in IP and the minimum value of IP exceeds $V_{TH}/K$. The graph plot of FIGURE 4 is further illustrated of some of these operational functions in showing a plot of both IP and $$\frac{dP_m}{dt} \text{ vs. time}$$

and the changes in value $K_m$ from a positive value to a negative value back and forth consistent with the plot of $dP_m/dt$ as related to the plot of IP both with respected time. Please note that for the brief intervals that switch 46 is opened through reset time periods, the peaks of the IP curve of FIGURE 4 are flattened to extend horizontally a short distance rather than being sharp peaks. Further, there is a third $K_m$ value state, a zero state, of the $dP_m/dt$ curve that is coincident with the reset time periods and the flattened peaks of the IP curve.

A problem of approaching an extremum from some arbitrary position is illustrated graphically, at least to some extent, in the FIGURES 5, 6 and 7 with FIGURES 5 a plot of IP for a particular two parameter case and with this value, as plotted, forming an inverted bell shaped surface with the bottom minimum value being the optimum minimum. FIGURE 6 is a related graph plot of $P_1$ vs. $P_2$ for the $$\frac{\partial IP}{\partial P_1} = 0$$

and also for the $$\frac{\partial IP}{\partial P_2} = 0$$

FIGURE 7 is a related graph of IP vs. $P_1$ showing the location of the IP plotted curve of $$\frac{\partial IP}{\partial P_1} = 0$$

that is substantially where the parameter selector switching action occurs from one parameter to the next, in other words, $P_1$ to $P_2$ in this illustrated example and is called the $P_1$ switching curve. The $P_2$ switching curve is where the control of $P_2$ is switched back to $P_1$ in solely a two parameter plant or equipment. FIGURES 8a, 8b, and 8c are plots of IP hunting traces relative to and as determined by the parameter $P_1$ and $P_2$ switching curves showing possible searching sequences for various degrees of coupling between the parameters. FIGURE 8a shows a searching sequence starting from an arbitrary position with reasonably nominal mutual coupling between control parameters and a search sequence of reasonable duration and change. The search sequence continues to ultimately an arbitrary predetermined stop neighborhood where the IP is reduced below a fixed threshold level and searching is stopped. With tighter mutual coupling between switching curves $P_1$ and $P_2$, as illustrated in FIGURE 8b, the switching curves are moved closer together resulting in a considerably longer search time. Obviously the searching time, preferably, should not be too long, as with such an excessively tight coupling, between the controlling parameter switching curves. It is advantageous for the switching controlling curves to be more loosely coupled, such as illustrated in FIGURE 8c. The more loosely coupled condition of FIGURE 8c insures, generally, a faster attainment of the stop zone setting. Please note that the large dots shown on the switching curve lines, at the various locales where switching from one parameter to another occurs, represent the area zone of hunting at these locales as controlled by direction reversals dictated by the direction computer.

The specific practical working example of an extreme parameter search control system 21′, shown in FIGURE 9, is a two parameter control system designed for alternately adjusting adjustable capacitance structure 47 and adjustable inductor structure 48 in the plant 20′ for minimizing the IP developed in the plant and applied back as an input for the extreme parameter search control system 21′. In this working example, the adjustable capacitive structure 47 and adjustable inductive coil structure 48 are the two interdependent adjustable parameter portions of an antenna coupler connecting two transceivers to the same antenna and providing isolation between the transceivers with the use of a hybrid although the operating frequency band of the transceivers is over an octave. It is an antenna coupler system with the transceivers capable of operating with a minimum frequency difference, for example, as low as from 5% to 10% of the operating frequencies, and with the IP feedback being the magnitude of the voltage signal at the input to the transceiver acting as a receiver in the plant 20′. Since the transceivers in such a plant are required to transmit and receive simultaneously, such an extrema control system as herein disclosed is very much desired. It should be realized that the index of performance, in other words, the magnitude of the signal voltage at the input to the transceiver acting as a receiver must be low enough as to not materially impair or reduce the sensitivity of the transceiver acting as a receiver through AGC action in that transceiver. It is an automatic extreme parameter search control system capable of completing its searching sequence in approximately one second with the two parameters adjusted with stepper motors and with various portions of the electronics circuitry consisting of off-the-shelf integrated circuits and a few discrete component circuits, and with the electronics control circuitry packaged within approximately ten cubic inches.

With the extreme parameter search control system of FIGURE 9 components the same as shown in other figures generally are numbered the same, and those similar, generally are provided with primed numbers, as a matter of convenience. An RF power level signal detector sensing the signal power at the receiver input, within plant 20′, develops a negative output voltage at the IP terminal thereof the absolute value of which is a direct measure of the RF signal power level at the receiver input. This negative DC voltage is applied as an input to direction computer 22″ and also as an input voltage to stop computer 23′. The absolute value of the negative IP voltage tends to be varied as either of the parameters are individually adjusted with this tending to vary slightly, one direction or the other, the voltage on the other side of the capacitor 36 at the common junction of the capacitor 36 and the DC operational amplifier 37. The amplifier 37, having an output connection to the input of threshold level detector circuit 38′, is bypassed by capacitor 39 and diode 40′, in parallel, with the anode of the diode 40′ connected to the junction of capacitor 36 and the input of amplifier 37. There is also a switching NPN transistor 41′ normally not biased to conduction bypassing the amplifier 37 with emitter connected to the input and collector connected to the output of the amplifier. Please note that the orientation of diode 40′ is reversed from the orientation of diode 40 in FIGURE 3, and that there is no resistor 45 provided in series with the emitter to collector circuit of transistor 41′ since the internal resistance of the transistor fulfills the corresponding requirements satisfied by the resistor 45 and prevents component burnout.

The input connection to threshold level detector circuit 38′ is through resistor 49 to the common junction of the cathode of Zener diode 50 and a capacitor 51 connected, on the other side, to ground. The anode of Zener diode 50 is connected to the common junction of resistor 52 connected at its other end to ground and to the base of NPN transistor 53, having an emitter connection to ground and a collector connection as a "not" terminal input 54 to flip-flop circuit 42′. The flip-flop circuit 42′ develops two outputs at terminal connections 55 and 56 which are applied back as feedback to input terminals 57 and 58, respectively, of the flip-flop circuit 42′. The output terminals 55 and 56 of flip-flop circuit 42′ are also connected as alternate actuating inputs through signal coupling capacitors 59 and 60, respectively, to one-shot trigger circuit 43′. Capacitors 59 and 60 are connected to the anodes of diodes 61 and 62, respectively, and through these diodes to and through resistor 63 to ground. The capacitors 59 and 60 are also connected to the cathodes of diodes 64 and 65 and through these diodes, respectively, to the junction of the base of NPN transistor 66 and resistor 67. The emitter of NPN transistor 66 is connected to ground and the collector is connected as a controlling bias signal voltage input to the base of switching NPN transistor 41'. The collector of NPN transistor 66 is also connected to and through resistor 68 to and along with resistor 67 in common to voltage supply 69, shown as being a positive 18 volt supply.

Please note that direction computer 22" signal output lines 24a' and 24b' extend from the output terminals 55 and 56, respectively, of flip-flop circuit 42' to signal gating devices in the three phase pulse generator circuit 70 with the signal output lines 24a' and 24b' being, in many respects, the operational equivalent of the output means 24a and 24b of the direction computer 22 in FIGURE 1. In developing outputs through signal lines 24a' and 24b' the direction computer 22" continually stores or continually adjusts to the value of IP in a memory unit, that is, by conduction through diode 40' with forwardly biasing voltages impressed thereon, and then charging of the capacitor 39 with reverse bias, as applied to the diode 40'. This is with, during periods of forward bias of the diode 40', the selected parameter being caused to change at substantially a constant rate with continuing drive therefor as controlled through the outputs of the direction computer 22". While the change of IP, the index of performance, is approaching the extrema, in this case a minimum with the minima representing a decreased RF signal power level as approached by an ascending voltage from a more negative voltage level particularly with a detector in plant 20' detecting the RF signal power level and providing a negative voltage output, the IP imposed bias on diode 40' substantially continuously biases the diode to conduction. When the change in IP is away from the minima and the absolute value of the negative IP voltage is increasing, as represented by descending to lower negative voltages, such as to reverse the bias on diode 40, the memory unit remembers the last best value of IP, i.e., the point of bias reversal with charging of the capacitor 39 beginning from there. The threshold circuit 38' senses charging of capacitor 39 as a measure of the difference between IP and the last previous minimum value IP and when this charge value reaches a threshold level, the changing parameter is stopped and the memory unit is reset by the biasing of NPN transistor 41' to conduction by application of a voltage to the base of the transistor for a short reset interval time as determined by electronic component time constant characteristics of the one-shot trigger circuit 43'. Then with the three phase pulse generator 70 providing a reverse control as determined by control outputs through lines 24a' and 24b' from the direction computer 22", the parameter being adjusted is adjusted in the opposite direction.

It should be noted that with the embodiment of FIGURE 9 that the direction computer 22" is such, with the orientation of diode 40', to cause parameter correction movement towards a minimum IP with the negative voltage level IP signal developed by the signal power level sensing detector in plant 20' with an ascending voltage in the positive direction of the IP input and that a descending IP signal results in a flip-flop actuation of the circuit. If, however, the IP voltage developed were positive, with the orientation of diode 40' shown, adjustment of the respective parameters 47 and 48 would, conversely, be in the IP maximizing direction as opposed to the minimizing parameter adjustment drive actions attained for the embodiment shown in FIGURE 9. It should be realized, further, that with reference to the reset intervals of time where discharge resetting of capacitor 39 is accomplished, as represented by the flattened peaks of the IP curve and by the zero $K_m$ state of the $dP_m/dt$ curve of FIGURE 4 may be substantially, if not completely, eliminated through alternating two capacitors in place of using only one capacitor 39 in the embodiments of FIGURES 3 and 9. This is with the two capacitors being alternately switched into and out of the circuit with each direction computer controlled change of parameter direction drive, and also with each change in selection of parameters and with each of the capacitors being reset discharged during the period of time that it is switched out of the operational circuit. This, of course, entails a switching arrangement, detail not shown, for switching from one capacitor to the other and for simultaneously switching a discharge path having at least a minimum impedance factor across the capacitor switched out of the operational circuit for the period of time that capacitor is switched out of the operational circuit.

The negative DC voltage IP signal representing the signal power level at the receiver input is also applied as an input to stop computer 23' where it is applied as an input to one end of a resistor 71, connected at its other end to the positive voltage supply 69. The resistor 71 has an adjustable tap 72 connection to the base of NPN transistor 73 and also through capacitor 74 to ground. NPN transistor 73 has an emitter connection through resistor 75 to ground and also to the emitter of NPN transistor 76. The collector of NPN transistor 73 is connected through resistor 77 to positive voltage supply 78, indicated as being a positive 5.1 volt supply, and through resistor 79 to the base of NPN transistor 76. The junction of resistor 79 and the base of transistor 76 is connected through resistor 80 to ground, and the collector of transistor 76 is connected through resistor 81 to voltage supply 78 and also to the cathode of Zener diode 82, and through the Zener diode to the base of NPN transistor 83. The junction of the anode of Zener diode 82 and the base of transistor 83 is connected through resistor 84 to ground, the emitter is connected to ground, and the collector output is connected through resistor 85 to the voltage supply 78. The collector output of transistor 83 also as the output of the stop computer 23' is connected as an input to the three phase pulse generator 70. The stop computer 23' acts to develop an output signal at the collector of NPN transistor 83 as an output therefrom if the resulting IP, as influenced by parameter inputs to the plant being adequately adjusted as reflected by minimized IP change through a predetermined length of time, as triggered, for example, by electronic component time constant characteristics within the stop computer 23'. The stop computer 23', when actuated, develops an output that acts to shut off the three phase pulse generator 70 and thereby cut off power to the three phase stepper motors providing the two parameters 47 and 48 drive inputs. With conservation of power and/or heating of the parameter drive motors a factor, the desired stop control is attained by NAND gating the stop computer output and the 44b' output of the one-shot trigger circuit 43' in a signal input circuit to the three phase pulse generator circuit 70.

The parameter selection computer 31' operates to successively select the next or, in the two parameter case, alternate between parameters as determined by predetermined signal input sequential criteria. This circuit includes a divide by three counter with a time dependent reset unit. The inputs to the parameter selection computer 31' include the two outputs of flip-flop circuit 42' of the direction computer 22", and two alternate phase clock frequency signal inputs from clock signal source multivibrator circuit 86. The clock signal source circuit 86 includes two NPN transistors 87 and 88 connected in an appropriate and conventional multivibrator type circuit to the positive voltage supply 78, and has collector output connections of the respective transistors 87 and 88 comprising the two alternate phase clock signal outputs of the multivibrator circuit 86. The transistor 88 collector output clock signal line 89 is connected as an input to NAND gate 90, and the alternate phase clock signal line 91 from the transistor 87 collector output of clock signal source circuit 86 is applied as an input to NAND gate 92 of the parameter selection computer circuit 31'. The transistor 87 collector output clock signal line 91 is also connected as a clock signal input to "not" terminal input connections 93 and 94 of flip-flop circuits 95 and 96, respectively, of the three phase pulse generator circuit 70.

Within the parameter selection computer 31' extensions of the alternate direction signal output lines 24a and 24b of the direction computer 22″ are connected as direction command signal input lines to NAND gates 97 and 98, respectively. The single outputs of NAND gates 97 and 98 are tied together in a common junction 99 that acts like an AND gate since when only one NAND gate 97 or 98 is developing an output, the output therefrom is dragged down to the ground potential reference back through the output circuit of the other NAND gate. The common terminal connection 99 of the NAND gates 97 and 98 is connected to "not" input terminal 100 of flip-flop circuit 101. Circuit 101 also has additional "not" terminal inputs 102 and 103 from NAND gates 90 and 92, respectively. Flip-flop circuit 101 is provided with a feedback connection from output terminal 104 to input terminal 105, and with an output terminal 106 connected back to input terminal 107 and also as an input to "not" input terminal 108 of flip-flop circuit 109. The flip-flop circuit 109 is also provided with two signal output terminals 110 and 111 which are connected back to input terminals 112 and 113, respectively, of the flip-flop circuit 109 and also back as the second inputs to NAND gates 98 and 97, respectively.

Output terminals 110 and 111 of flip-flop 109 are connected as dual activating inputs to a one-shot trigger circuit 115 within the parameter selection computer that is very similar to the one-shot trigger circuit 43′ located in the direction computer 22″ and therefore components substantially the same are numbered using primed numbers. Further, much of the description with respect to the trigger circuit 43′ in direction computer 22″ is applicable to the one-shot trigger circuit 115. The collector output of the one-shot trigger circuit 115 is connected to a signal inverter circuit 116 having an output connection back as second inputs to both of the NAND gates 90 and 92. The one-shot trigger circuit 115, as the time dependent reset unit within the parameter selection computer 31′, comes into operation if changes in output do not appear at the output terminals 110 and 111 of flip-flop circuit 109 within predetermined RC time constant value determined time limits. When this occurs the developed output of trigger circuit 115 provides for resetting the count by three circuitry and simultaneously controls the circuit for the next parameter setting by application of the otuput signal back as an input to the two NAND gates 90 and 92 in the parameter selection computer 31′.

The output terminals 110 and 111 of flip-flop 109 are each connected, as outputs of the parameter selection computer 31′, to three NAND gates 117a, 117b and 117c, and 118a, 118b and 118c, respectively, in the motor control circuits 119 and 120, respectively, for three phase stepper motors 121 and 122. The output drives 123 and 124 of motors 121 and 122 are, respectively, drive connected to the adjustable capacitive parameter structure 47 and the adjustable inductive parameter structure 48.

The three phase pulse generator circuit 70 input connections from the collector of transistor 83, of stop computer 23′, and the signal line 44b′ from the one-shot trigger circuit 43′, of the direction computer 22″, are connected as inputs to NAND gate 125. The output of NAND gate 125 is connected as an input to AND gates 126, 127, 128 and 129, with the outputs of AND gates 126 and 127 connected as inputs to flip-flop circuit 96, and with the outputs of AND gates 128 and 129 connected as inputs to flip-flop circuit 95. Output terminal 130 of flip-flop circuit 96 is connected back as a second input to AND gate 127. The other output terminal 131 of flip-flop circuit 96 is connected back as an input to AND gate 126, and also as an input to NAND gates 132, 133 and 134. Output terminal 135 of flip-flop circuit 95 is connected back as a second input to AND gate 129. The other output terminal 136 of flip-flop circuit 95 is connected back as a second input to AND circuit 128, also to the "not" input terminal 137 of flip-flop circuit 96, and also as an input to NAND gates 133, 138 and 139. The output of NAND gate 133 is connected back as an input to the "not" input terminal 140 of flip-flop circuit 95, and to signal inverter 140a.

As has been pointed out hereinbefore, the transistor 87 collector clock signal output of the clock signal source 86 is connected as an additional input to the "not" input terminals 93 and 94 of flip-flop circuits 95 and 96, respectively, in the three phase pulse generator 70. Further, the direction computer 22″ flip-flop 42′ output lines 24a and 24b are connected signal line 24a to NAND gates 132 and 139, as the second inputs thereto, and signal line 24b to NAND gates 134 and 138, as the second inputs thereto, in the three phase pulse generator 70. The three phase pulse generator circuit 70 has three phase output terminals 141a, 141b and 141c, with the terminal 141a connected to the outputs of both NAND gates 132 and 138 to thereby act like an AND gate since if one of the NAND gates does not develop an output while the other does, the one without an output drags the NAND gate output being developed down to ground. The output terminal 141b is connected through inverter 140a to gate 133, and the output terminal 141c is connected to the output terminals of both NAND gates 134 and 139 to thereby act like an AND gate since here again if one of the NAND gates does not develop an output it drags the other NAND gate developing an output down to ground. The output terminal 141a is connected as an input to the AND gates 117a and 118a, the output terminal 141b is connected as an input to the NAND gates 117b and 118b, and output terminal 141c is connected as an input to the NAND gates 117c and 118c of the stepping motor drive circuits 119 and 120, respectively. Please note that phase signal power amplifying circuits 142a, 142b and 142c are provided in the connections between the outputs of NAND gates 117a, 117b and 117c, respectively, and the a, b and c terminals of three phase pulse drive motor 121 in the motor drive circuit 119. In like manner, phase signal power amplifiers 143a, 143b and 143c are provided in the circuit connections between NAND gates 118a, 118b and 118c, respectively, and the a, b and c terminals of three phase stepper motor 122 in the motor drive circuit 120.

Thus, there is provided a three phase pulse generator circuit 70 having three phase logic output signal terminals for step driving the particular motor 121 or 122, as the case may be, at the input pulse rate as determined by the clock signal source. The motor 121 or 122 being driven is driven in the command direction as determined by the inputs from direction computer 22″ as applied through lines 24a and 24b to NAND gates 132 and 139, and 134 and 138, and with the particular parameter adjusting motor being activated and driven as determined by controlling inputs from the parameter selection computer as applied to the NAND gates 117a, b, and c or 118a, b, and c, respectively. Further, whenever there is a signal input to the NAND gate 125 from the one-shot trigger circuit 43′ of the direction computer 22″, or from the stop computer 23′, the three phase pulse generator circuit 70 is stopped, through the duration interval of such input signals, from providing three phase output drive to either of the parameter setting drive motors 121 or 122.

Referring now to FIGURE 10, the functional simplified partial block circuit diagram shown is illustrative of the three-phase stepper motor drive pulse generator circuit 70 with many of the circuit connections removed for simplicity of understanding and to relate the curves of FIGURE 11a and the information of the Truth Table of FIGURE 11b to the embodiment of FIGURE 9. This shows an input from a clock signal reference source indicated as the timing signal "T" input to "not" terminals 93 and 94 of flip-flop circuits 95 and 96, respectively. It illustrates the A and B outputs of flip-flops 96 and 95, respectively, and also the D and $\overline{D}$ inputs from lines 24b and 24a, respectively, from the direction computer 22″ as inputs in various combinations by two of the A, B, D and $\overline{D}$ inputs to the NAND gates 132, 133, 134, 138 and 139 in the specific combinations portrayed. The one, two, and three outputs at the terminals 141a, 141b and 141c and the A, B and D waveforms developed and the related truth information are portrayed in the curves of FIGURE 11a and FIGURE 11b, respectively.

Referring back again to the DC operational amplifier 37 in the specific embodiment shown in FIGURE 9, it should be noted that the amplifier 37 is provided with a positive reference voltage input connection from the positive 18 volt supply 69 through resistor 144, and with a Zener diode 145 connected cathode to the junction between the resistor 144 and the amplifier 37 and anode to ground.

Thus, there is hereby provided an extrema control system, for a plant having a plurality of interdependent variable parameters, with a direction computer and controlling circuit switchable from parameter to parameter for optimizing the controlled setting of the parameter before the subsequent switching to another parameter. A parameter selection computer is also provided that is subject to parameter selection switching after a series of three reversals in direction as determined by the direction computer, and that provides for switching from one parameter to the next parameter after a predetermined length of time has passed without reversals as determined by RC time constant circuit characteristics for insuring that switching to another parameter occurs. A three phase stepper pulse signal generating circuit is also provided receiving a desired pulse rate clock input signal, from a clock signal source, and direction command signal inputs for developing, as needed and called for, three phase logic signals for step positioning parameter drive motors at the clock input pulse rate and in the command direction called for. These extrema control systems include a DC operational amplifier in the direction computer with the DC operational amplifier having a feedback capacitor and a diode in parallel that are capable of a memory function, in that, when the diode is forwardly biased it conducts. Then when there is such a change in the input to the amplifier, as determined by an IP signal out of the plant being parameter set controlled, that a reverse bias is developed through the operational amplifier 37 with respect to the diode a charge build up begins on the capacitor in parallel with the diode in feedback around the amplifier. This results in an activating voltage level build up to a voltage threshold for a threshold controlled trigger circuit in the direction computer and direction reversal actuation of the direction computer circuit occurs as determined by the signal and not by internal noise out of the amplifier. The direction computer also includes switch means for periodically reset discharging any charge impressed on the feedback capacitor in parallel with the diode about the operational amplifier and with this reset switching action occurring with the initiated triggering activation of the threshold circuit and additional circuit actuation triggered thereby in the direction computer.

Whereas this invention is herein illustrated and described with respect to a specific embodiment thereof, it should be realized that various changes may be made without departing from the essential contributions to the art made by the teachings hereof.

I claim:

1. In a control system for adjusting a control parameter to vary an index of performance (IP) value of a plant to an extreme limit with the IP sensed in the form of a DC voltage: directional controlled parameter adjusting means; a direction reversing control circuit connected for receiving the IP signal voltage as a DC input and including, an amplifier unidirectional current flow means and capacitive means connected in parallel with the amplifier; threshold voltage detecting means connected to the output of said amplifier; voltage output switching means connected to said threshold voltage detecting means and connected to said directional controlled parameter adjusting means; switch activated circuit means for discharge resetting of said capacitive means connected to said voltage output switching means for discharge resetting of said capacitive means with each switch action activation of said switch activated circuit means; wherein, said amplifier is a DC operational amplifier; said unidirectional current flow means is a diode; said capacitive means is a capacitor; and with the diode and capacitor connected in parallel with each other and between the input and the output of said DC operational amplifier; with a signal coupling capacitor between IP input DC line means and the input of said DC operational amplifier; and wherein said threshold voltage detecting means includes a zener diode connected cathode to the output of said operational amplifier; and including a transistor with base connected to the anode of the zener diode, emitter to ground, and collector as an output to said voltage output switching means.

2. The control system of claim 1, wherein said voltage output switching means is a flip-flop circuit having two outputs, and with the flip-flop circuit subject to flip-flop actuation with each signal input thereto from said threshold circuit.

3. The control system of claim 2, wherein said switch activated circuit means has a one-shot trigger circuit connected to both outputs of said flip-flop circuit for activation by an output from either of said outputs of the flip-flop circuits; and output means of said one-shot trigger circuit being connected for activation in switch activated circuit means for discharge resetting of said capacitive means in parallel with the said amplifier.

4. The control system of claim 3, wherein said one-shot trigger circuit includes component time constant characteristic means insuring sufficient output signal duration to insure substantially complete discharge resetting of said capacitive means in parallel with said amplifier with each activation of said one-shot trigger circuit.

5. The control system of claim 4, wherein the output of said one-shot trigger circuit has an additional output connection to said directional controlled parameter adjusting means; and with deactivating means included in said directional controlled parameter adjusting means and connected to the output of said one-shot trigger circuit for deactivation of said parameter adjusting means throughout substantially the duration of each output signal of said one-shot trigger circuit and each period of capacitive means discharge resetting.

6. The control system of claim 5, including system parameter adjustment stop circuit means with component time constant characteristic means connected for receiving the IP signal voltage as a DC input and having output means connected to said deactivating means in said directional controlled parameter adjusting means for deactivation of said parameter adjusting means as triggered with minimized IP voltage change through a time as determined by said component time constant characteristic means and activation of the stop circuit means.

7. The control system of claim 3, wherein the switch activated circuit means for discharge resetting of said capacitive means parallel to said amplifier is a transistor with base connection, for bias activation to conduction of the transistor, to a voltage signal output of said one-shot trigger circuit; and with the emitter collector circuit of the transistor being connected in a discharge path across said capacitive means in parallel with said amplifier.

8. In a control system for adjusting a control parameter to vary an index of performance (IP) value of a plant to an extreme limit with the IP sensed in the form of a DC voltage: directional controlled parameter adjusting means; a direction reversing control circuit connected for receiving the IP signal voltage as a DC input and including, an amplifier, unidirectional current flow means and capacitive means connected in parallel with the amplifier; threshold voltage detecting means connected to the output of said amplifier; voltage output switching means connected to said threshold voltage detecting means and connected to said directional controlled parameter adjusting means; switch activated circuit means for discharge resetting of said capacitive means connected to said voltage output switching means for discharge resetting of said capacitive means with each switch action activation of said switch activated circuit means; wherein there is a plurality of adjustable control parameters of said plant each adjustable to vary the IP of said plant; and including parameter selection means connected to output connective means of said voltage output switching means; directional controlled parameter adjusting means for each of said control parameters; and output means of said parameter selection means connected to selectively alternately individual activating means of the plurality of control parameters.

9. The control system of claim 8, including system parameter adjustment stop circuit means with component time constant characteristic means connected for receiving the IP signal voltage as a DC input and having output means connected for cut off of said directional controlled parameter adjusting means as triggered by minimized IP voltage change through a time as determined by said component time constant characteristic means and activation of the stop circuit means.

10. The control system of claim 8, including a clock reference signal source; wherein said directional controlled parameter adjusting means includes, a three phase pulse generator and motor drive means connected for drive adjusting said adjustable control parameters; with said directional controlled parameter adjusting means connected for receiving direction controlling and drive rate controlling inputs from said voltage output switching means of said direction reversing control circuit, and from said clock reference signal source, respectively; and gate means connected to said output means of said parameter selection means and located in said directional controlled parameter adjusting means for parameter selection means controlled activation of selected individual adjustable control parameters of the plant.

11. The control system of claim 8, wherein said parameter selection means includes a divide by predetermined number counter, and connection to receive outputs of said voltage output switching means for a predetermined number of reversals of a parameter adjustment drive by the same numerical function as with said divide by predetermined number counter before developing an output control from said parameter adjusting means for switching successively from one parameter adjustment drive to another.

12. The control system of claim 11, also including trigger circuit means in said parameter selection means connected to signal means in the parameter selection means, and including time constant determining components effective to develop a signal on means connected to the divide by predetermined number counter effective to reset the divide by predetermined number counter and to simultaneously control switching to the next parameter.

References Cited

UNITED STATES PATENTS

| | | | |
|---|---|---|---|
| 3,096,471 | 7/1963 | Taylor | 235—150.1 X |
| 3,105,928 | 10/1963 | Congleton et al. | 235—150.1 X |
| 3,184,686 | 5/1965 | Stanton | 235—150.1 X |
| 3,346,726 | 10/1967 | Rouxel et al. | 235—150.1 |

MALCOLM A. MORRISON, Primary Examiner

J. F. RUGGIERO, Assistant Examiner

U.S. Cl. X.R.

235—151.1